(12) United States Patent
Doskocz

(10) Patent No.: US 7,475,933 B2
(45) Date of Patent: Jan. 13, 2009

(54) SNAP-IN DECORATIVE ARTICLES FOR VEHICLE INTERIORS

(75) Inventor: Fiona Doskocz, Northville, MI (US)

(73) Assignee: International Automotive Components Group North America, Inc., Dearborn, MI (US)

(*) Notice: Subject to any disclaimer, the term of this patent is extended or adjusted under 35 U.S.C. 154(b) by 189 days.

(21) Appl. No.: 11/220,120

(22) Filed: Sep. 6, 2005

(65) Prior Publication Data

US 2006/0051557 A1    Mar. 9, 2006

Related U.S. Application Data

(60) Provisional application No. 60/608,322, filed on Sep. 9, 2004.

(51) Int. Cl.
B62D 25/20 (2006.01)
B62D 25/14 (2006.01)

(52) U.S. Cl. .................. 296/97.23; 296/70
(58) Field of Classification Search ............. 296/97.23, 296/70, 37.3
See application file for complete search history.

(56) References Cited

U.S. PATENT DOCUMENTS

| | | | | |
|---|---|---|---|---|
| 2,012,929 A | * | 8/1935 | Knowland | 428/62 |
| 3,817,015 A | * | 6/1974 | Frangos | 52/511 |
| 3,930,084 A | * | 12/1975 | Shields | 428/67 |
| 4,029,834 A | * | 6/1977 | Bartlett | 428/62 |
| 4,109,439 A | * | 8/1978 | Feasel | 52/667 |
| 4,721,641 A | * | 1/1988 | Bailey | 428/88 |
| 4,952,434 A | * | 8/1990 | Rumsey et al. | 428/54 |
| 4,974,698 A | * | 12/1990 | Smith | 181/150 |
| 5,157,804 A | * | 10/1992 | Williams | 15/161 |
| 5,482,759 A | * | 1/1996 | Primeau | 428/167 |
| 6,217,098 B1 | * | 4/2001 | O'Brien et al. | 296/70 |
| 6,526,626 B1 | * | 3/2003 | LoTufo | 16/110.1 |
| 6,635,331 B2 | * | 10/2003 | Kessler | 428/100 |
| 6,726,268 B2 | * | 4/2004 | Leimer | 296/97.23 |
| 6,757,945 B2 | * | 7/2004 | Shibuya et al. | 24/662 |
| 6,926,348 B2 | * | 8/2005 | Krueger et al. | 296/184.1 |
| 6,986,547 B2 | * | 1/2006 | Parrish | 296/193.07 |
| 7,185,465 B2 | * | 3/2007 | Pacione | 52/311.2 |
| 2002/0139070 A1 | * | 10/2002 | Berndt, Jr. | 52/177 |

FOREIGN PATENT DOCUMENTS

EP    0338623    * 10/1989

OTHER PUBLICATIONS

J.C. Whitney & Co., catalog 556J, published Jul. 1993, pp. 29, 30, 108, & 109, dashboard covers & custom-fit carpet door panels.*

* cited by examiner

*Primary Examiner*—Dennis H Pedder
(74) *Attorney, Agent, or Firm*—Myers Bigel Sibley & Sajovec, P.A.

(57) ABSTRACT

A vehicle floor covering includes a layer of material having a plurality of apertures formed therethrough, and a plurality of decorative articles releasably secured within the respective plurality of apertures. The decorative articles are configured to alter the aesthetic appearance of the floor covering. Each aperture includes a peripheral edge and each decorative article includes a peripheral edge having a groove configured to releasably receive the peripheral edge of a respective aperture. Other decorative articles may be secured to other portions of a vehicle interior to alter the aesthetic appearance of vehicle interior.

15 Claims, 4 Drawing Sheets

SNAP-IN DECORATIVE ARTICLES FOR VEHICLE INTERIORS

RELATED APPLICATION

This application claims the benefit of and priority to U.S. Provisional Patent Application No. 60/608,322 filed Sep. 9, 2004, the disclosure of which is incorporated herein by reference as if set forth in its entirety.

FIELD OF THE INVENTION

The present invention relates generally to vehicles and, more particularly, to vehicle interiors.

BACKGROUND OF THE INVENTION

Vehicle manufacturers typically provide some type of covering for vehicle floors. Vehicle floor coverings are typically configured to provide a resilient and decorative wearing surface with heat insulating and sound deadening qualities. For example, the use of carpeting as a vehicle floor covering is well known. Carpeting used to cover a vehicle floor is typically molded into a contoured configuration that conforms to the contour of a vehicle floor so as to fit properly. The use of molded thermoplastic polymer compositions as floor coverings for vehicles known as sport utility vehicles (SUVs), which recently have found growing popularity among consumers, is also known. Vehicle manufacturers are continuously seeking cost-effective and aesthetic enhancements for vehicle interiors including floor coverings.

SUMMARY OF THE INVENTION

In view of the above discussion, a vehicle floor covering is provided that includes a layer of material having a plurality of apertures formed therethrough, and a plurality of decorative articles releasably secured within the respective plurality of apertures. The decorative articles are configured to alter the aesthetic appearance of the floor covering. According to some embodiments of the present invention, each aperture includes a peripheral edge and each decorative article includes a peripheral edge having a groove configured to releasably receive the peripheral edge of a respective aperture.

According to some embodiments of the present invention, a vehicle floor covering is provided that includes a layer of material having a recessed portion and a peripheral edge extending around the recessed portion. An insert is releasably secured within the recessed portion that alters the aesthetic appearance of the floor covering. According to some embodiments of the present invention, the insert has a peripheral edge with a groove configured to releasably receive the peripheral edge extending around the recessed portion. The insert includes opposite sides and can be releasably secured within the recessed portion with either side exposed. According to some embodiments of the present invention, one side of the insert comprises carpeting and the other side comprises a layer of molded thermoplastic material.

According to some embodiments of the present invention, a vehicle compartment includes a floor, an instrument panel, and one or more trim panels, such as door panels, etc. A vehicle floor covering disposed on the floor includes a layer of material having a plurality of apertures formed therethrough. A first plurality of decorative articles are releasably secured within the respective plurality of apertures and are configured to alter the aesthetic appearance of the floor covering. A second plurality of decorative articles are secured to the instrument panel and are configured to alter the aesthetic appearance of the instrument panel. A third plurality of decorative articles are secured to one or more trim panels and are configured to alter the aesthetic appearance of the one or more trim panels. The first, second and third plurality of decorative articles may have similar aesthetic appearances, or may have different aesthetic appearances. Combined, however, the various plurality of decorative articles alter the aesthetic appearance of a vehicle interior.

BRIEF DESCRIPTION OF THE DRAWINGS

The accompanying drawings, which are incorporated in and constitute a part of the specification, illustrate embodiments of the present invention and, together with the description, serve to explain principles of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
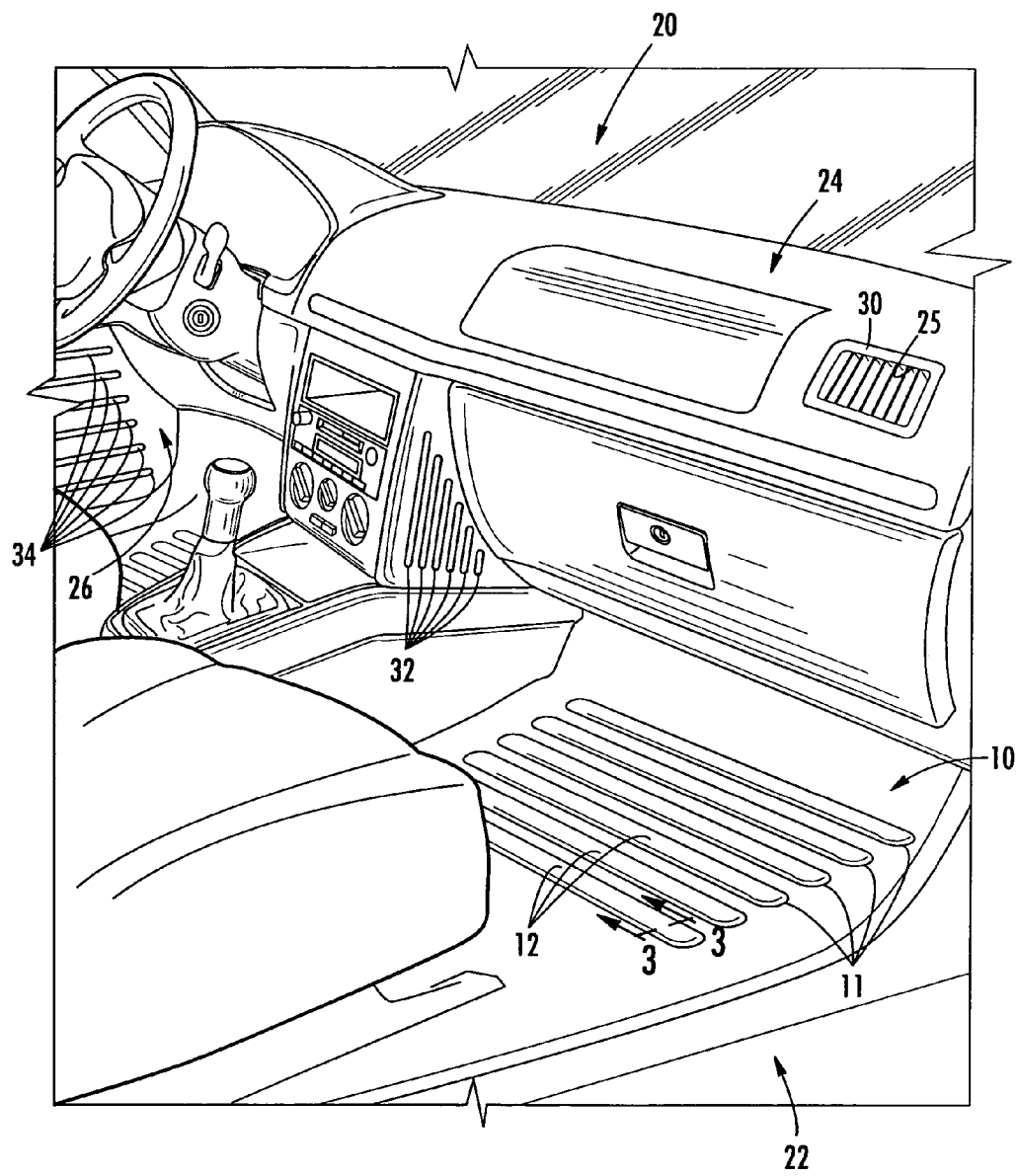
FIG. 1 is a perspective view of a vehicle interior compartment according to some embodiments of the present invention.
Figure 2:
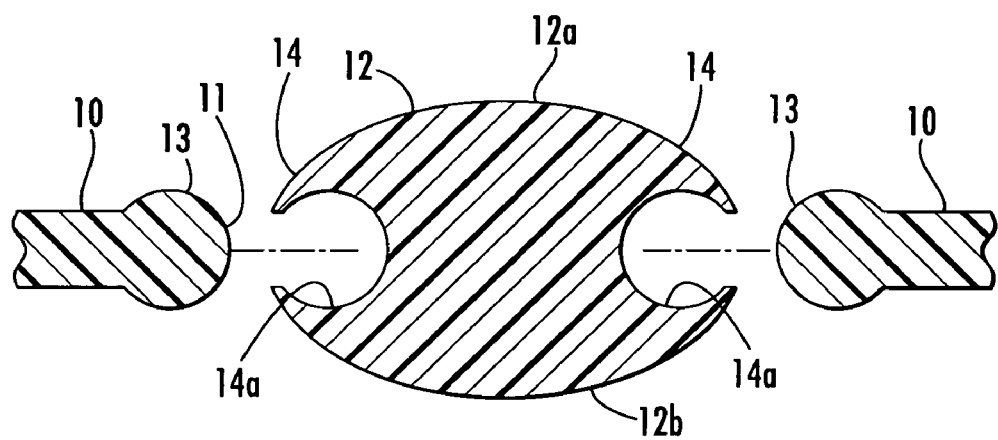
FIGS. 2-3 are cross sectional views of a portion of a vehicle floor covering and a snap-in decorative article, according to an embodiment of the present invention.
Figure 3:
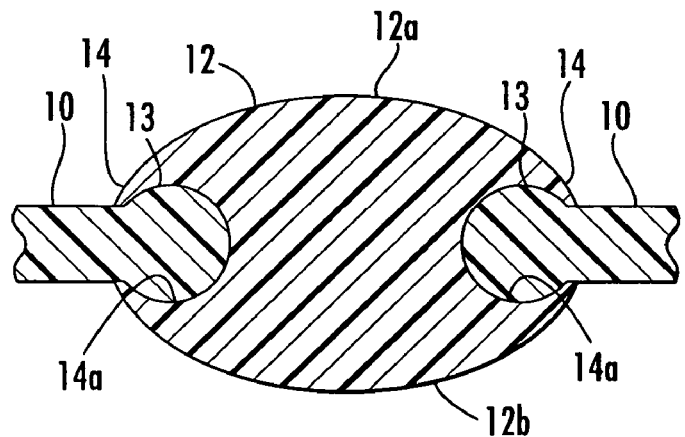

Referring now specifically to FIGS. 1-3, reference number 10 generally indicates a vehicle floor covering having a plurality of "snap-in" decorative articles 12 that alter the aesthetic appearance of the floor covering in accordance with an embodiment of the present invention. Snap-in decorative articles 12, according to embodiments of the present invention, are configured to be easily removed and installed by users.

The floor covering 10 illustrated in FIG. 1 has a nonplanar three dimensional molded configuration adapted to fit the floor of a vehicle. It is to be understood that the particular three dimensional configuration illustrated is merely for purposes of illustration. Vehicle floor coverings incorporating snap-in decorative articles according to embodiments of the present invention may have various configurations and shapes depending on the floor configuration of a vehicle. Moreover, floor coverings from cargo areas, as well as passenger areas of a vehicle, may incorporate snap-in decorative articles according to the embodiments of the present invention.

Vehicle floor coverings incorporating snap-in decorative articles according to embodiments of the present invention may comprise various types of material. For example, the floor covering 10 may include carpeting. Alternatively, the floor covering 10 may be a molded thermoplastic polymeric material.

The illustrated floor covering 10 has a plurality of apertures 11 formed therethrough in which the decorative articles 12 are releasably secured. The floor covering 10 may be a single layer of material or may be a laminate of multiple layers of material. The apertures 11 may be formed through a single layer of material, multiple layers of material or all layers of material of the floor covering 10.

In the illustrated configuration, the apertures 11 have an elongated configuration and are arranged in substantially parallel, spaced-apart relationship. However, it is understood that the number and arrangement of apertures 11 in which snap-in decorative articles 12 are releasably secured can vary. Embodiments of the present invention are not limited to the illustrated configuration of apertures 11 and snap-in decorative articles 12.

In the illustrated embodiment, the snap-in decorative articles 12 each have a surface 12a that extends above a surface 10a of the floor covering 10. However, embodiments of the present invention are not limited to this configuration. Snap-in decorative articles according to embodiments of the present invention may have surfaces that are substantially flush with the surface of a floor covering or that are recessed beneath the surface of a floor covering Snap-in decorative articles 12, according to embodiments of the present invention can facilitate personalization and customization of vehicle interiors, and can aesthetically enhance vehicle interiors. Snap-in decorative articles, according to embodiments of the present invention, may include all types of badges and inserts, may be formed from various types of materials (e.g., wood, metals, polymeric materials and combinations thereof), and may have various shapes, sizes and configurations. Moreover, snap-in decorative articles, according to embodiments of the present invention, may include various indicia, such as trademarks, tradenames, insignias, logos, designs, and may have various colors and color combinations. For example, the illustrated snap-in decorative articles 12 may have the same color or different colors. Moreover, different groups of the snap-in decorative articles 12 may have different respective colors.

Snap-in decorative articles 12, according to embodiments of the present invention, may be reversible (e.g., may be configured with multiple sides or surfaces that can be exposed) so as to allow a user to change personalization and customization within a vehicle. For example, as illustrated in FIGS. 2-3, the snap-in decorative article 12 may be releasably secured within an aperture 11 so that either one of the surfaces 12a,12b is facing upwardly from the floor covering 10.

According to embodiments of the present invention, snap-in decorative articles may include corresponding air vent covers and other interior trim components (e.g., for door panels, head liners, consoles, etc.) having a similar configuration/style/color as the floor covering snap-in decorative articles. Accordingly, a vehicle interior can be personalized in a way heretofore unavailable in conventional vehicle interiors.

Referring to FIGS. 2-3, a cross-sectional view of a snap-in decorative article 12 and corresponding aperture 11 in the floor covering 10 is illustrated. FIG. 2 is an exploded, cross sectional view of an aperture 11 and snap-in decorative article 12. FIG. 3 is cross sectional view that illustrates the snap-in decorative article 12 releasably secured within the aperture 11. The illustrated aperture 11 is defined by a floor covering peripheral edge 13a. The snap-in decorative article 12 includes a peripheral edge 14 having a groove 14a configured to releasably receive the aperture peripheral edge 13.

In the illustrated embodiment, the aperture peripheral edge 13 serves as a male connector and the groove 14a in the snap-in decorative article peripheral edge 14 serves as a female connector configured to releasably engage with the male connector. However, the present invention is not limited to the illustrated embodiment. For example, the snap-in decorative article 12 may have male connectors that are configured to releasably engage with female connectors in a vehicle floor covering.

Referring back to FIG. 1, a vehicle passenger compartment 20 is illustrated that includes a floor 22, an instrument panel 24, and a door panel 26. The floor covering 10 includes a plurality of decorative articles releasably secured within respective apertures 11 in the floor covering 10 as described above. The instrument panel 24 includes an air vent 25 having a decorative cover 30 configured to alter the aesthetic appearance of the air vent 25. The instrument panel 24 also includes a plurality of decorative articles 32 secured thereto, as illustrated, and which are configured to alter the aesthetic appearance of the instrument panel 24. The door panel 26 includes a plurality of decorative articles 34 secured thereto that are configured to alter the aesthetic appearance of the door panel 26. The various decorative articles 12,30,32,34 can be used to accessorize/personalize the interior of a vehicle.

According to embodiments of the present invention, the decorative articles 12,30,32,34 may have a similar aesthetic appearance. For example, the decorative articles 12,30,32,34 may have the same color, style, configuration, etc. Alternatively, the decorative articles 12,30,32,34 may have different colors, styles, configurations, etc. Various combinations of configurations, styles and colors may be utilized. For example, the decorative articles 12,30,32,34 may be configured in the team colors and/or insignia of a person's favorite sports team.

The decorative articles 30,32,34 may be secured to the respective instrument panel and door panel in various ways. For example, the decorative articles 30,32,34 may be secured adhesively. Alternatively, the decorative articles 30,32,34 may have a similar configuration to the decorative articles 12 in the floor covering 10 and may be configured to snap-in respective apertures in the instrument panel and door panel, respectively.

Figure 4:
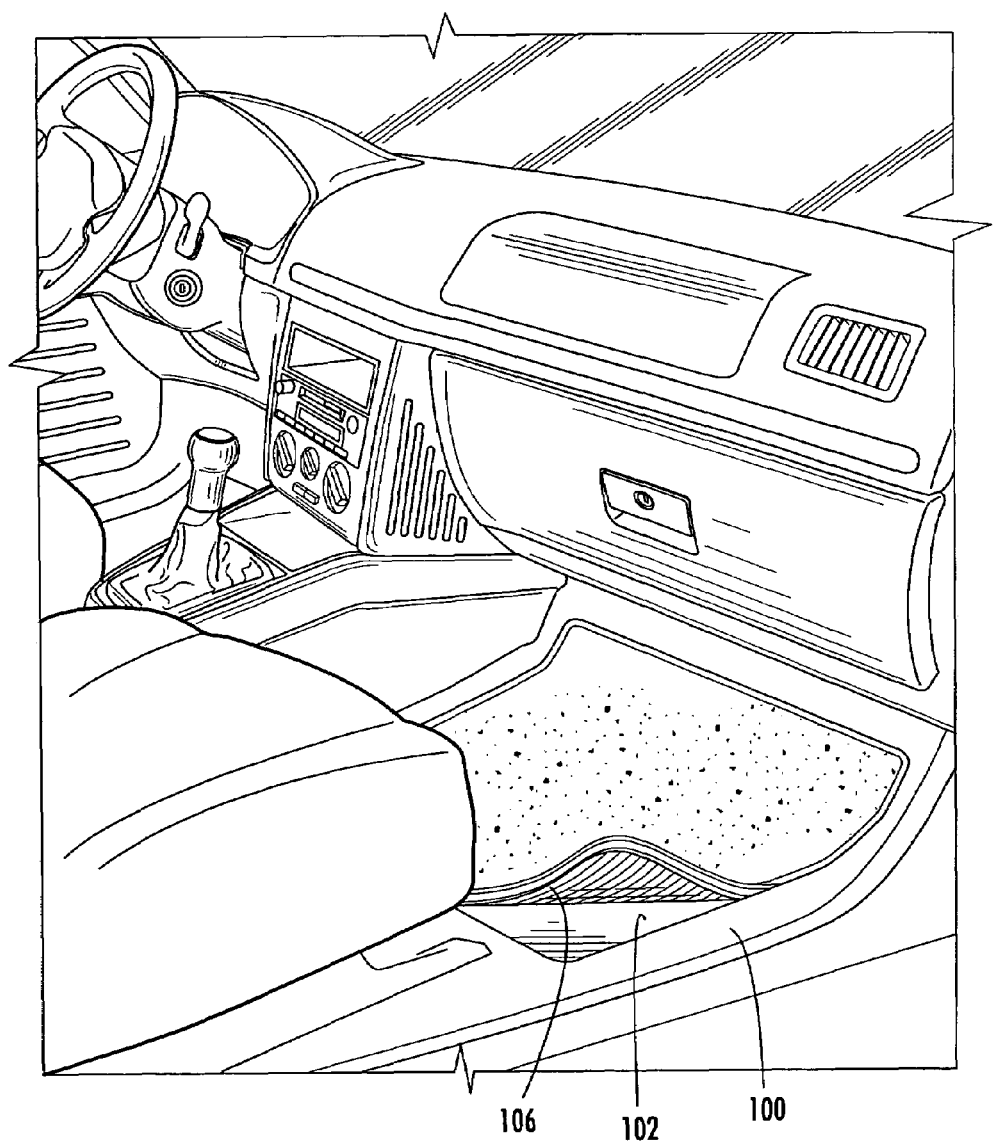
FIG. 4 is a perspective view of a vehicle interior compartment according to some embodiments of the present invention.
Figure 5:
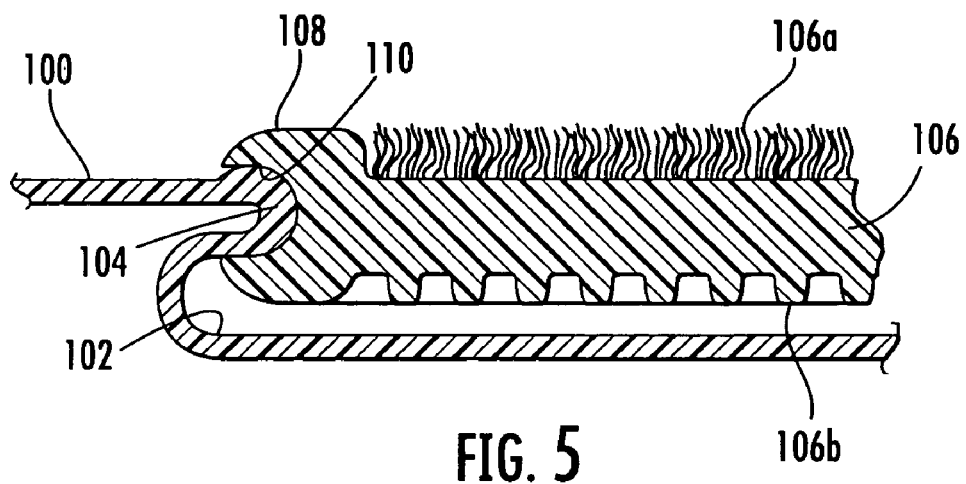
FIGS. 5-6 are cross sectional views of a portion of a vehicle floor covering and a snap-in decorative article, according to an embodiment of the present invention.
Figure 6:
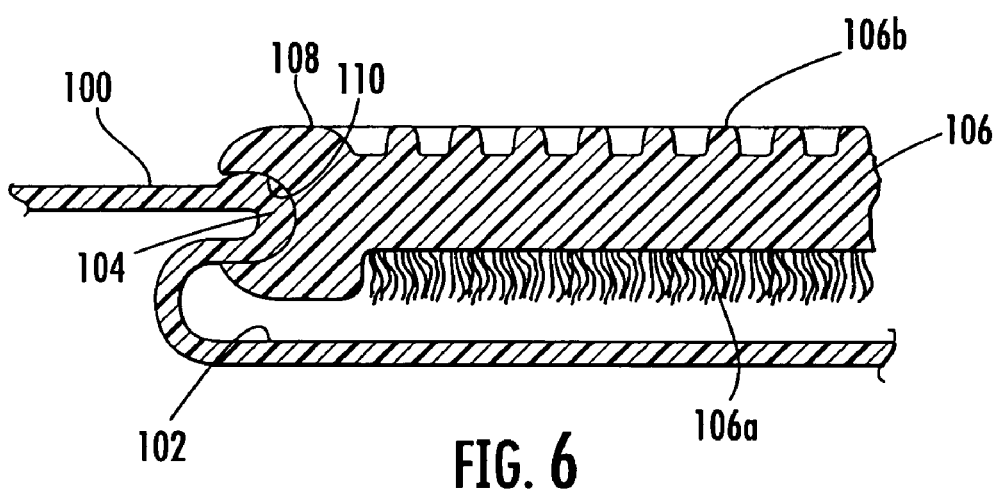

Referring to FIGS. 3-5, a vehicle floor covering 100, according to another embodiment of the present invention, is illustrated. The floor covering 100 includes a recessed portion 102 and a peripheral edge 104 extending around the recessed portion 102. A decorative insert 106 is releasably secured within the recessed portion 102 and is configured to alter the aesthetic appearance of the floor covering 100. The decorative insert 106 includes a peripheral edge 108 having a groove 110 that is configured to releasably receive the peripheral edge 104 extending above and around the recessed portion 102. The decorative insert 106 is configured to be easily removed and installed by users.

The decorative insert 106 includes opposite sides 106a, 106b and can be releasably secured within the recessed portion 102 with either side exposed. In the illustrated embodiment, side 106a is carpeting (e.g., tufted, woven, knitted, or non-woven construction) and side 106b includes a layer of molded thermoplastic material.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this That which is claimed is:

1. A vehicle floor covering, comprising:
   a layer of material having a plurality of apertures formed therethrough; and
   a plurality of solid, one-piece decorative articles releasably secured within the respective plurality of apertures that are configured to alter the aesthetic appearance of the layer of material, wherein each decorative article comprises opposite decorative surfaces, wherein each aperture comprises a peripheral edge, wherein each decorative article comprises a peripheral edge having a groove configured to releasably receive the peripheral edge of a respective aperture, wherein each decorative article can be releasably secured within a respective aperture with either decorative surface exposed, and wherein at least one of the decorative articles has a surface that extends above a surface of the layer of material.

2. The vehicle floor covering of claim 1, wherein the layer of material has a nonplanar three dimensional contoured configuration adapted to conform to a contour of a vehicle floor.

3. The vehicle floor covering of claim 1, wherein the apertures have an elongated configuration and are in substantially parallel, spaced-apart relationship.

4. The vehicle floor covering of claim 1, wherein the decorative articles comprise material selected from the group consisting of polymeric materials, wood, and metals.

5. The vehicle floor covering of claim 1, wherein at least two of the decorative articles have different colors.

6. The vehicle floor covering of claim 1, wherein the layer of material comprises carpeting.

7. The vehicle floor covering of claim 1, wherein the layer of material comprises thermoplastic polymeric material.

8. A vehicle, comprising:
   a vehicle compartment including a floor and an instrument panel;
   a vehicle floor covering, comprising:
      a layer of material having a plurality of apertures formed therethrough; and
      a first plurality of decorative articles releasably secured to the layer of material within the respective plurality of apertures, wherein each aperture comprises a peripheral edge, wherein each decorative article comprises a peripheral edge having a groove configured to releasably receive the peripheral edge of a respective aperture, and wherein the first plurality of decorative articles are configured to alter the aesthetic appearance of the floor covering; and
   a second plurality of decorative articles releasably secured within respective apertures in the instrument panel, wherein the second plurality of decorative articles are configured to alter the aesthetic appearance of the instrument panel, and wherein the first and second plurality of decorative articles have a similar aesthetic appearance.

9. The vehicle floor covering of claim 8, wherein at least one of the second plurality of decorative articles comprises an air duct outlet cover.

10. The vehicle floor covering of claim 8, wherein the first and second plurality of decorative articles comprise material selected from the group consisting of polymeric materials, wood, and metals.

11. A vehicle floor covering, comprising:
    a layer of carpeting having a plurality of apertures formed therethrough, wherein each aperture comprises a peripheral edge; and
    a plurality of solid, one-piece decorative articles releasably secured to the carpeting within the respective plurality of apertures that are configured to alter the aesthetic appearance of the layer of carpeting, wherein each decorative article comprises opposite decorative surfaces, wherein each decorative article can be releasably secured within a respective aperture with either decorative surface exposed, and wherein each decorative article comprises a peripheral edge having a groove configured to releasably receive the peripheral edge of a respective aperture.

12. The vehicle floor covering of claim 11, wherein the layer of carpeting has a nonplanar three dimensional contoured configuration adapted to conform to a contour of a vehicle floor.

13. The vehicle floor covering of claim 11, wherein the apertures have an elongated configuration and are in substantially parallel, spaced-apart relationship.

14. The vehicle floor covering of claim 11, wherein the decorative articles comprise material selected from the group consisting of polymeric materials, wood, and metals.

15. The vehicle floor covering of claim 11, wherein at least two of the decorative articles have different colors.

* * * * *